United States Patent
Angal et al.

(10) Patent No.: US 6,484,200 B1
(45) Date of Patent: Nov. 19, 2002

(54) DISTINGUISHED NAME SCOPING SYSTEM FOR EVENT FILTERING

(75) Inventors: Rajeev Angal, Santa Clara, CA (US); Shivaram Bhat, Sunnyvale, CA (US); Michael Roytman, Glenview, IL (US); Subodh Bapat, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/330,790

(22) Filed: Jun. 11, 1999

(51) Int. Cl.[7] ............................................... H04L 12/26
(52) U.S. Cl. ...................... 709/224; 709/218; 370/352
(58) Field of Search ............................... 709/203, 224, 709/227, 232, 216, 218, 206; 370/352; 710/10, 4

(56) References Cited

U.S. PATENT DOCUMENTS

| | | | |
|---|---|---|---|
| 5,537,611 A | 7/1996 | Rajagopal et al. | 379/221.07 |
| 5,678,041 A * | 10/1997 | Baker et al. | 709/227 |
| 5,848,243 A * | 12/1998 | Kulkarni et al. | 709/224 |
| 6,141,777 A | 10/2000 | Cutrell et al. | |
| 6,147,975 A * | 11/2000 | Bowman-Amuah | 370/352 |
| 6,182,119 B1 | 1/2001 | Chu | |
| 6,249,883 B1 | 6/2001 | Cassidy et al. | |

\* cited by examiner

*Primary Examiner*—Ayaz Sheikh
*Assistant Examiner*—Khanh Quang Dinh
(74) *Attorney, Agent, or Firm*—B. Noël Kivlin

(57) ABSTRACT

Method and system for allowing a computer network operations manager to subscribe for and receive notifications concerning network events from one or more objects or object levels, as defined by distinguished name scoping, and optionally having at least one event characteristic from a selected list. The selected list of characteristics may include: one or more levels of network objects involved in the event; one or more specified network nodes involved in the event; a specified geographical region in which said event occurs; a specified period of days within which the event occurs or is initiated; a specified time interval within which the event occurs or is initiated; a specified class of devices involved in the event; and an event of one or more specified event types.

15 Claims, 6 Drawing Sheets

EVENT CHARACTERISTICS SPECIFICATION

| CHARACTERISTIC | PARAMETER(S) | DON'T CARE (x) |
|---|---|---|
| OBJECT LEVEL INDICATOR (SINGLE) | _____ | _____ |
| OBJECT LEVEL INDICATORS (MULTIPLE) | _____ | _____ |
| EVENT SOURCE (NODES) | _____ | _____ |
| EVENT SOURCE (GEOGRAPHICAL REGION) | _____ | _____ |
| DATA OF EVENT OCCURRENCE | _____ | _____ |
| TIME INTERVAL OF EVENT OCCURRENCE | _____ | _____ |
| DEVICE TYPE(S) INVOLVED | _____ | _____ |
| EVENT SEVERITY | _____ | _____ |
| EVENT TYPE | | |

*Fig. 5*

DISTINGUISHED NAME SCOPING SYSTEM FOR EVENT FILTERING

CROSS REFERENCE TO RELATED PATENT APPLICATIONS

This patent application is related to other patent applications, filed herewith on the same day and entitled "Apparatus, Methods And Computer Program Products For Network Management Operations Relating To Network Management Protocol Adapter Security Software (MPASS) For Single And Multiple Users", Ser. No. 09/330,902, "Secure User Association And Set-Up Using Network Management Protocol Adapter Security Software (MPASS)", Ser. No. 09/330,932, "Messaging With User Name Access Identification Using Network Management Protocol Adapter Security Software (MPASS)", Ser. No. 09/330,521, "Independent Log Containment Hierarchy", Ser. No. 09/330,514, and "Domain Access Control For Logging Systems", Ser. No. 09/332,270. These related patent applications are hereby expressly referenced and incorporated herein in their entirety.

COPYRIGHTS IN PATENT MATERIAL

Portions of this patent document contain material subject to copyright restriction. The copyright owner has no objection to facsimile reproduction of the patent document after grant, as it appears in the U.S. Patent and Trademark Office files or records, but otherwise reserves all rights relating thereto.

TECHNICAL FIELD

The field of this application relates to apparatus, methods and computer program products relating to network management operations and protocol adapter security software.

BACKGROUND OF THE INVENTION

Network management is performed by network carriers and operators to ensure that mission-critical networks are continually operating normally, without service-affecting problems. Accordingly, network management platforms, such as the Sun Microsystems Solstice Enterprise Manager (SEM) are employed. The SEM is a management framework that complies with Telecommunications Management Network (TMN) standards, as defined by the International Telecommunications Union (ITU). To ensure that an operator's network is functioning properly, it is necessary to monitor or listen for information on events that might indicate network status changes. For example, failure of a network switching device or break in a circuit may produce an event that is received and processed by the SEM network management platform.

An "event" may be defined as a signal, or the underlying occurrence, indicating that one or more changes has occurred in the state of an entity or device on the network. Event signals may include a communications alarm signal (indicating that a device has come on-line, has gone off-line or has developed a problem), an equipment alarm signal (occurrence of an error state), a quality-of-service alarm signal (deterioration of the strength or resolution or throughput of a signal or group of signals), security alarm signal (indicating that unauthorized access has been detected), and an attribute change (indicating that data for a device or process are no longer available, for reasons other than occurrence of an error).

To control and coordinate the software associated with a network of computers and peripherals, network managers often employ special purpose software designed to track, establish communications with and control other software entities and processes that represent one or more network reporting devices (referred to as "agents") or that exist independently. Software used by the network manager interacts with various platform-level software services to allow the network manager to locate and interact with other entities running on the network. Entities on the network can communicate with each other and with a network manager by sending and receiving messages with agreed-upon formats. A message can be a request, a response or an event signal. An entity running on the network may "subscribe to" notifications of events generated by other entities so that a cooperative relationship between the entities can be maintained. Given the number and variety of events that can occur, the volume of event notifications processed by the network management software can be very large, even when few or no error messages are being transmitted. This volume can reduce system performance dramatically.

Typically, a computer network will rely upon a single, centralized service to manage, process and/or monitor the network communications. This reliance upon a single service to process such high volumes of data creates a risk of catastrophe or collapse if the central service fails, even with swift recovery. These risks are not acceptable for large-scale networks that must be available at all hours, seven days per week. Further, if all event notifications must be processed and analyzed by each network operator or monitor, each such operator may have to provide enormous computing power for this purpose, even where the amount of information of interest to an operator is small.

During an associated event processing activity, appropriate operators are notified and corrective actions may be taken. In a large network, events occur very frequently, perhaps on the order of hundreds of events per second. Accordingly, efficient event notification processing and distribution is a key to successful network management platform operation. Currently, events are characterized by event type, indicating the nature of the event, to the extent that this information is determinable. Possible event types are defined in the managed object's management information base (MIB). By subscribing to particular types of events, a network manager can receive notifications of events of a particular type. When a network manager subscribes to several notifications of several types of events, an event filtering mechanism or discriminator is implemented, using common management information system (CMIS) filtering to ensure that only notifications of selected event types are forwarded for consideration by the subscribing network manager.

However, there is currently no mechanism permitting a network manager to receive notifications concerning events associated with a specified source. It is not possible for a network manager to receive information focusing on a selected managed object or objects. However, it is frequently desirable for a network manager to be able to subscribe only to events from particular sources or objects. For example, a network management operator responsible for cellular switches in and around Frankfurt might only want to receive event notifications concerning the Frankfurt portion of the network. This is a practical, long-felt need of network operators throughout the world, as well as in the United States. Further, it is desirable that the event notification processing be scalable to correspond to the volume that is anticipated under given circumstances on a network.

SUMMARY OF THE INVENTION

This invention makes it possible to subscribe to notification of events that arise or occur at specified sources or specified objects. This makes it easier for a Solstice Enterprise Manager (SEM) to focus on the portion of a network of interest to that operator and reduces the burden on an SEM application developer, who would otherwise have to subscribe to all event notifications from all sources, and then to use custom code to laboriously filter or screen out events from sources or objects that are of no interest to the developer. According to the invention, the SEM operator may specify one or more event characteristics and/or one or more levels of objects associated with a computer network. An object may have associated with it one or more attributes or characteristics, such as an event type, the location (node or group of nodes) or region where an event occurred, a date and/or time interval during which one or more events of interest occurred, a type of component or device that was affected by an event, and other similar attributes. With this specification in place, only events that arise from one or more specified levels of objects and have specified characteristics are registered for consideration by that developer.

The SEM infrastructure is enhanced, according to the invention, to permit filtering internally, according to the source or object associated with an event. A network management operator thereafter receives only event notifications only from one or more specified sources and, optionally, only as to specified types of events. Accordingly, a sophisticated and improved capability is provided to allow network operators to more precisely specify notifications of events to be received. This improves the ability to focus on the portion(s) of the network system of particular concern to the operator.

The SEM has a distributed client-server architecture in which clients or applications use the services offered by the server or platform. One service offered by the platform is subscription for event notifications from network agents managed by the platform, based on one or more filtering criteria. An event notification distribution subsystem (EDS), according to the invention, allows transmission of an event notification to an event subscriber, an application that monitors network communications for event notifications (ENs) in which the event subscriber is interested. The event subscriber specifies a discriminator mechanism or CMIS filter, which is written in a predetermined CMIS filter specification. The event source includes an application or service entity that issues an EN that will be received by one or more identified event subscribers, if certain characteristics or attributes of an underlying event agree with attributes specified by an event discriminator.

However, this type of CMIS filter is of limited flexibility and does not permit specification of, and subscription for, notification of "wild card" events associated with one or a group of distinguished names (DNs). The present invention permits an application to receive notifications of all events whose objects belong to one or more specified levels of objects. A managed object may agree with a given data network prefix, which may include a specification of site, channel and/or element. For example, if the prefix is set to SiteId=5, ENs corresponding to all events with SiteId=5 and ChannelId=DC (don't care) and ElementId=DC will be received and registered by the EN application.

According to the invention, an EN received by an application passes its DN prefix for scoping, in addition to specific information concerning characteristics of the underlying event. Use of a DN scoping mechanism allows reduction in the number of fan-out events within the EDS, because an application only registers for events that are likely to be of common interest. Thus, the present invention permits receipt of ENs for all events whose managed object instances (MOIs) agree with a specified DN prefix. DN filtering may be implemented by specifying a DN scope and at least one DN attribute.

BRIEF DESCRIPTION OF THE DRAWINGS

FIG. 5 illustrates a suitable set of interrogatories that can be used to specify the event filtering to be used according to the invention.

DESCRIPTION OF PREFERRED MODE OF THE INVENTION

Figure 1:
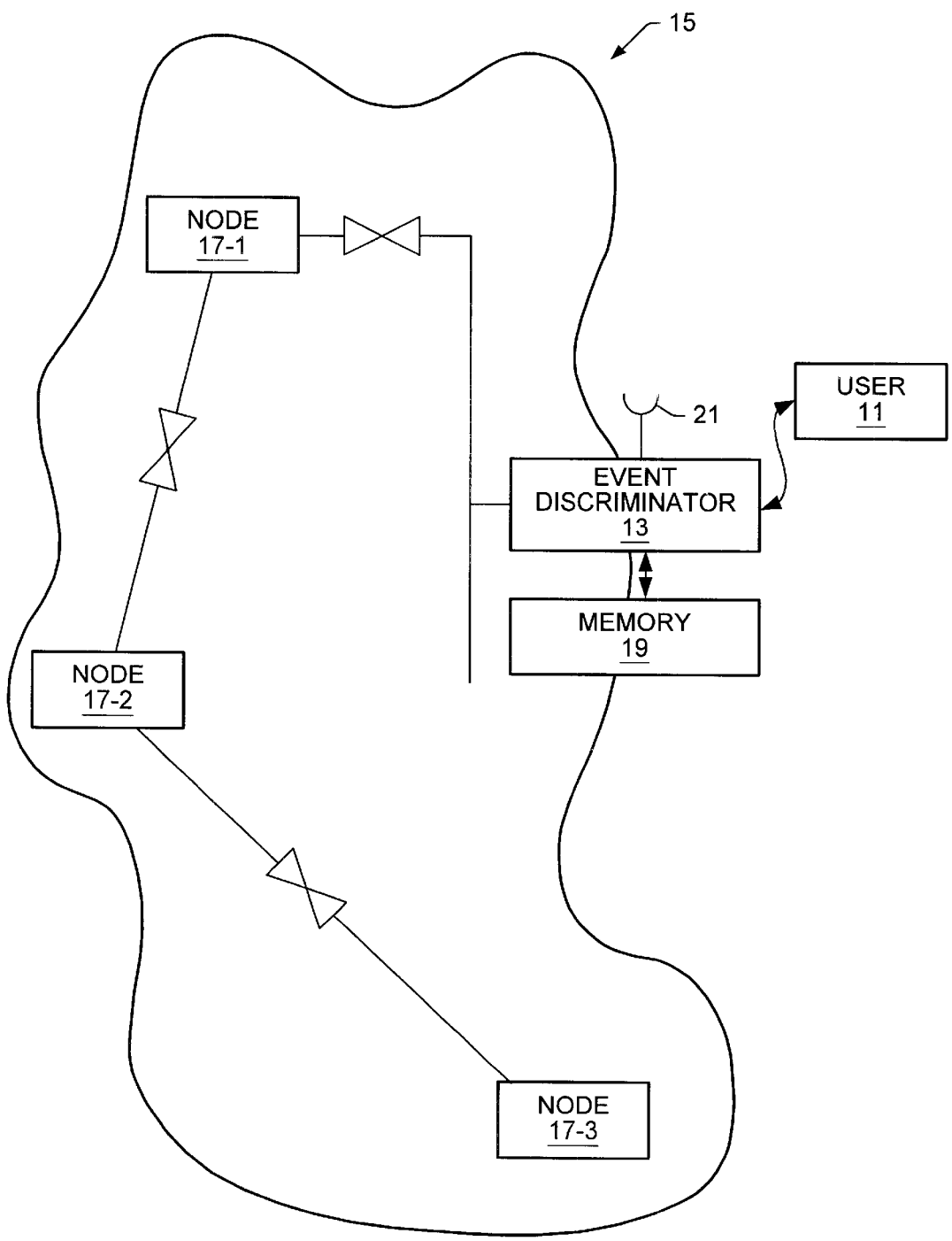
FIG. 1 illustrates an environment in which the invention can be used.

FIG. 1 illustrates general operation of an event notification distribution system (EDS) according to the invention. A user 11 communicates with a discriminator mechanism (DM) 13, which may include a network agent that communicates with and monitors the communications that pass across a network 15. The network 15 includes a plurality of nodes or other network participants, 17-1, 17-2, 17-3, that communicate with each other using the network. One or more nodes 17-i (i=1, 2, 3, . . . ) reports from time to time on certain events that have occurred at that node or that affect that node, usually by transmission of an event notification that contains relevant information describing or characterizing the event to one or more other nodes and/or to a central reporting station.

For example, a crosspoint switch in an asynchronous transport mode (ATM) network may transmit a notification of congestion upstream from that switch, using an upstream control signal, and/or downstream from that switch, using a downstream control signal, to request that other switches reduce the rate at which communications are transmitted to the congested switch. Alternatively, a new node may join or rejoin the network 15 and may transmit certain interrogation signals informing other nodes of certain characteristics of the new node and attempting to determine the location of the new node.

The DM 13 is preferably located on or adjacent to the network 15 so that any communication concerning an event that occurs at or affects a specified node or group of nodes on the network will pass by or through the DM. The DM 13 listens promiscuously to, and analyzes, all communications, such as ENs, that pass by or through itself. When the DM 13 determines that a given communication concerns one or more objects in a specified level, or group of levels, of objects for which the DM has responsibility, the DM temporarily or permanently records the communication in a memory unit 19. Optionally, a transmitter 21 associated with the DM 13 and/or the memory unit 19 subsequently transmits this recorded information to all nodes or other devices on or adjacent to the network 15 that have subscribed to events that arise at or concern the specified objects.

Alternatively, the DM 13 may transmit information on the event communication directly to the network management operator (NMO) without delay. The DM 13 thus filters the communications in terms of specified objects and object levels and (optionally) and in terms of one or more specified event characteristics, such as event type, event location, time and/or date of event occurrence, and/or type of component or device involved in the event. DM filtering may occur by scanning each passing communication for any mention, in a data header, the data itself or a data trailer, of an object or class of objects or event characteristics for which the DM 13 is directed to scan. This DM filtering and reporting will occur independently of whether the reported communication is successfully received by its intended recipients on the network.

Figure 2:
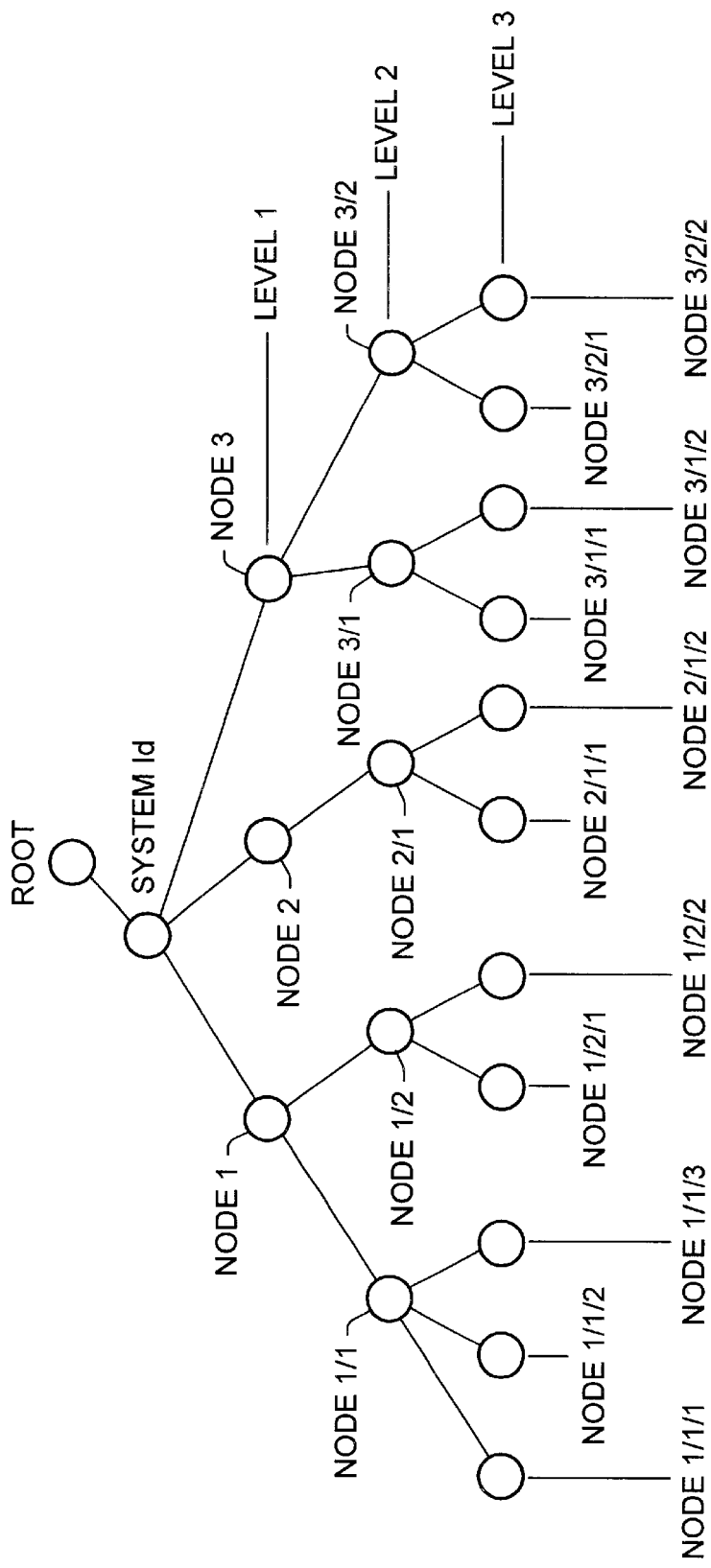
FIG. 2 illustrates some of the object levels that can be specified according to the invention.

FIG. 2 illustrates a management information tree (MIT) having several levels of objects. At the top of the tree is a root level, from which all other levels descend. Immediately below the root level, and connected thereto, is a systemId level that can serve as a level zero for related objects. The next lower level ("level one") in the example shown in the diagram has three objects, with associated nodes indicated respectively as node1, node2 and node3. The next lower level ("level two") has five objects, indicated as node1\1 and node1\2 (both connected to node1 in level one), node 2\1 (connected to node2), and node 3\1 and node3\2 (connected to node3). The next lower level ("three") has 11 objects, indicated as nodes 1\1\1, 1\1\2 and 1\1\3 (connected to node 1\1 in level two), nodes 1\2\1 and 1\2\2 (connected to node 1\2), nodes 2\1\1 and 2\1\2 (connected to node 2\1), nodes 3\1\1, 3\1\2 and 3\1\3 (connected to node 3\1), and nodes 3\2\1 and 3\2\2 (connected to node 3\2). Additional levels of objects can be added and identified in a similar manner.

Beginning from the root node at the top of the tree in FIG. 2, one can specify a path to reach a particular object or node. For example, a path to reach the object associated with the node 3\1\2 can be specified as {nodeId="root"/nodeId="systemId"/nodeId="node3"/nodeId="node3\1"/nodeId="3\1\2"}

The invention and the object/node specification notation discussed here allows an operator to specify ENs associated with: (1) one or more objects, such as node31/2 and node 2\1\1; (2) a given level of objects, such as node 1\1, node 1\2, node 2\1, node 3\1 and node 3\2; (3) all objects between and including a first specified level and a second specified level (e.g., between levels two and five); (4) all objects at lower levels connected to a given object, such as all lower level objects connected to node 1\2; and other suitable specifications of objects based on object levels.

Figure 3:
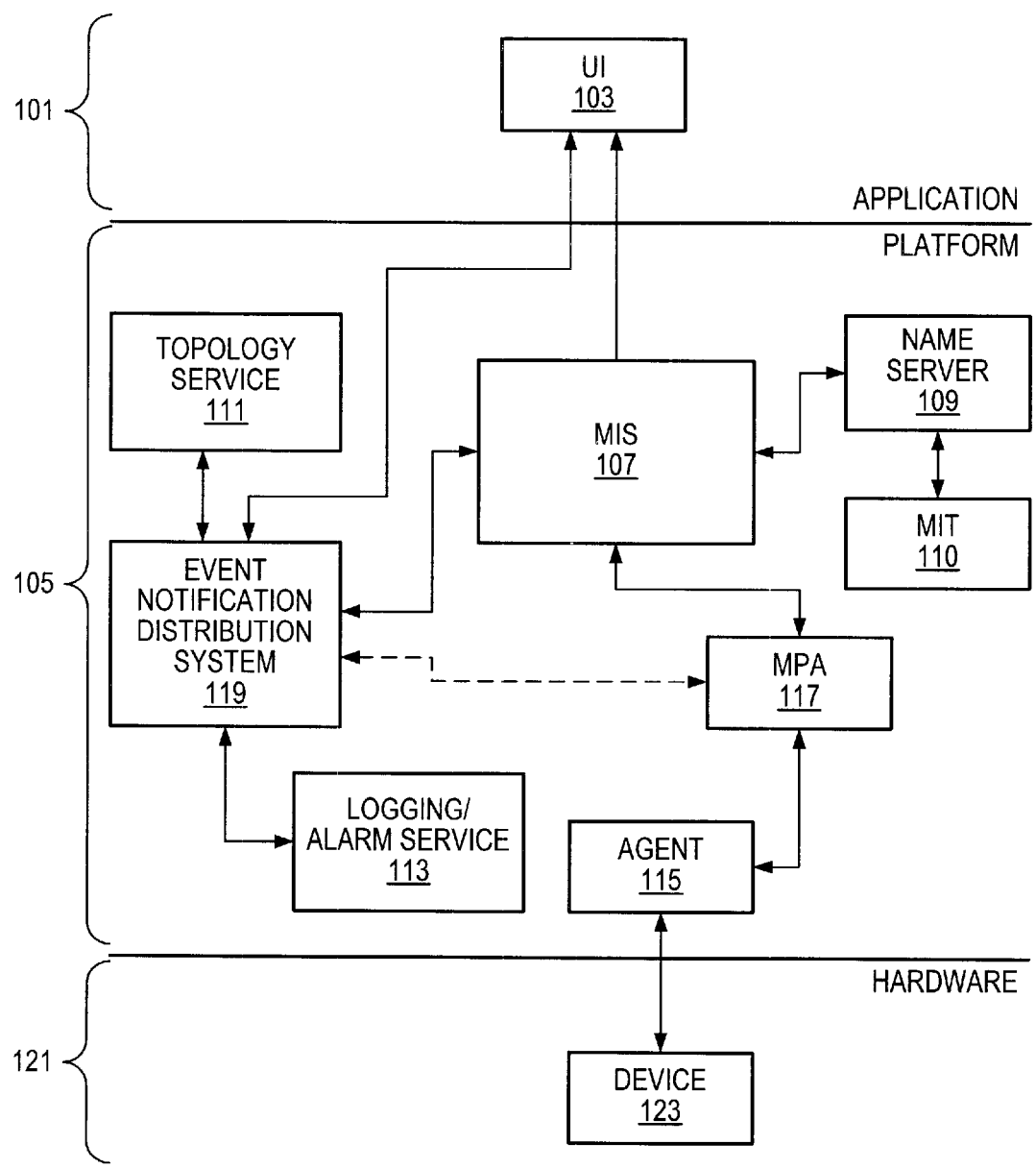
FIG. 3 illustrates three well known layers of a network.

Computer network software and hardware operations can be organized conceptually into an application or user layer, a platform layer and a hardware layer. As illustrated in FIG. 3, the application layer 101 in a network 100 includes user interface (UI) software 103, which allows a network user to communicate with software and hardware installed on the network. A user can send requests, receive responses, reply to requests, receive alarm signals, receive status reports, locate and control devices installed on the network. The hardware layer 121 includes the physical devices 123 installed on the network. Examples of these devices include computers, communications devices, bridges, routers, gateways, servers, hubs, modems, printers, display screens, scanners and network interface cards.

The platform layer 105, located between and communicating with, the application layer 101 and the hardware layer 121, includes network management software that allows a network administrator, operating an application such as the UI 103, to obtain access to, and to provide communication between, entities and devices on the network. Network communications, including event notifications, may be handled by a centralized management information server (MIS) 107 that coordinates messages sent between entities and devices operating on each of the network layers. The MIS 107 interacts with a DN server 109, connected to an MIT 110, that provides a database including names and network addresses for all entities and devices installed on the network. A topology service 111 and a logging/alarm service 113 provide resources for managing network entities, devices and alarms and for keeping track of any changes in network topology.

The platform layer may further include one or more agents 115 and a message protocol adapter (MPA) 117 that allow communication between one or more devices 123 in the hardware layer 121 and the MIS 107. An event notification distribution system (EDS) 119, as described above and preferably located in the platform layer 105, communicates with the MIS 107, the topology server 111, the logging/alarm server 113 and the UI 103. The EDS 119 processes event notifications and transmits these signals to various client or listener entities on the network. In a first embodiment, the EDS 119 runs on a separate processor and reduces computational overhead associated with the MIS 107. Using one processor for the MIS 107 and a second processor for the EDS 119 reduces the likelihood that the MIS and the EDS will fail or malfunction simultaneously. In a second embodiment, the EDS 119 operates as a separate process through the MIS 107. In a third embodiment, the EDS 119 operates as part of the same process within the MIS 107.

Figure 4:
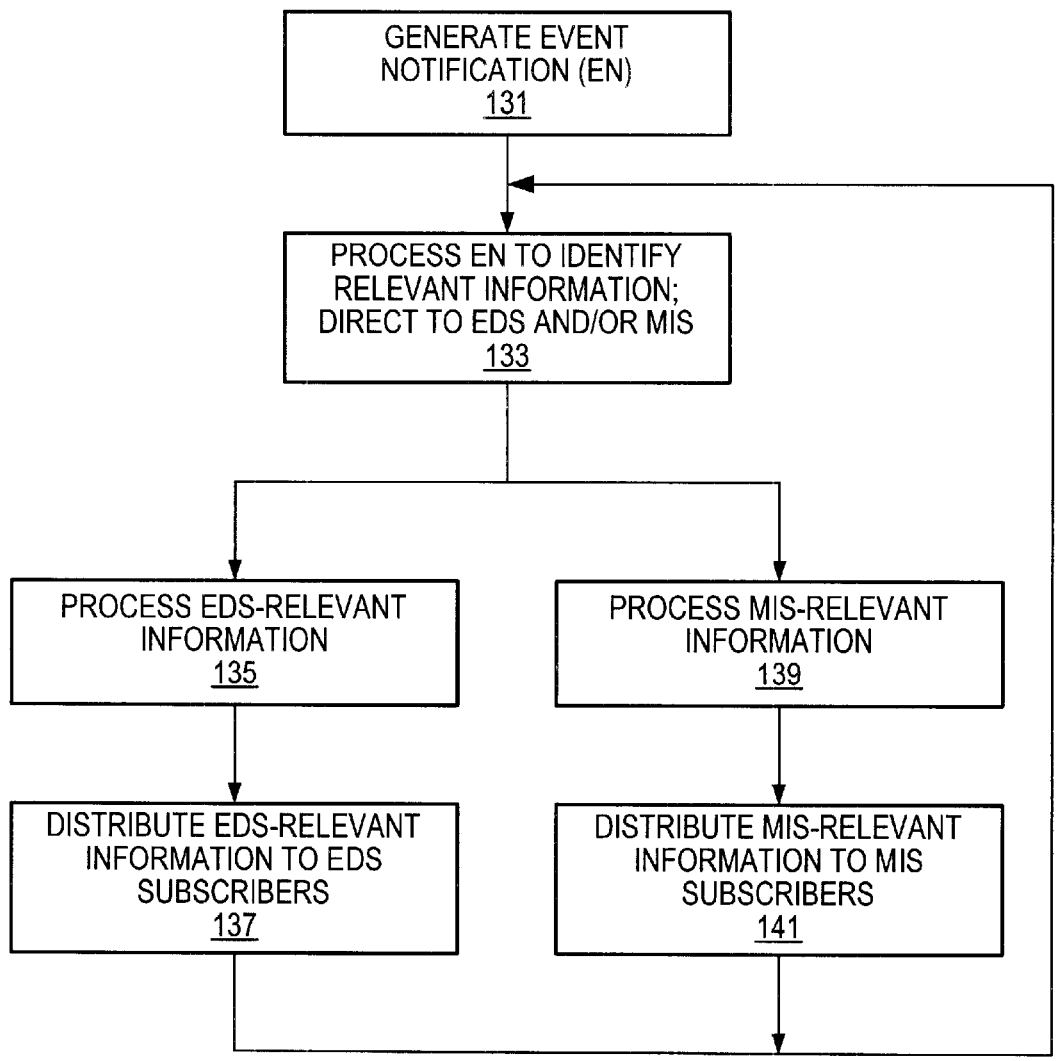
FIG. 4 illustrates event processing according to the invention.

Initiation of event notification is illustrated in a flow chart in FIG. 4. At step 131, an event notification is generated on the network. At step 133, the EN is processed, using any suitable intermediary, such as an MPA, that operates between the event notification generator 131 and an EDS and/or an MIS. The intermediary directs the EN to an EDS and/or to an MIS, using several criteria, such as object level(s) associated with each mentioned DN, source and time/date of the event, severity of the event, type of intermediary and type of client-listener. The system then determines, in step 135, if the EN information should be sent initially to the EDS.

If the answer to the question in step 135 is "yes", the EDS receives and processes the EDS-relevant information for event reporting, in step 137, and sends any MIS-relevant information to the MIS, in step 139, for further processing. The system then moves to step 145.

If the answer to the question in step 135 is "no", the MIS receives and processes the MIS-relevant information for event reporting, in step 141, and sends any EDS-relevant information to the EDS, in step 143, for further processing. The system then moves to step 145.

In step 145, the system sends (or temporarily holds for later transmission) EN information on relevant events, if any, to the appropriate event reporting subscribers on the network and recycles to step 133 (or step 131) to receive another incoming EN.

Alternatively, the EDS can process all ENs. This approach will often promote efficiency in EN signal handling but will not provide any redundancy if the EDS fails or malfunctions.

Presently, a network operator may subscribe for, and receive notifications of, all network events classified by event type, using a discriminator mechanism. Specified event type or types might include congestion, erratic component operation, component failure, error rate outside prescribed bounds, and other similar types of events that directly or indirectly reflect or affect network operations. The present invention allows a network operator to subscribe for, and receive notifications of, all events occurring at or affecting specified levels of objects and having specified attributes. Other attributes associated with an object may include a specified geographic location or region where the event occurred, a specified class of components or devices (e.g., switches or buffers), a class of events that occur or are initiated in a specified time interval or upon a specified date, and event severity, among other things.

Filtering based on DN scoping requires specification of DN scope (e.g., which object or object level or levels are involved). This DN filtering optionally works with and operates on top of existing (CMIS) filtering that is already in place, such as EN filtering based on event type.

For example, a DM 13 may be directed to scan for SiteId, ChannelId, ElementId, date and/or time of occurrence of event, type of device, component or node ("source"), and location of source within a prescribed region, as well as for type of event, according to the invention.

FIG. 5 illustrates a suitable sequence of interrogatories that can be presented to the NMO in order to specify event filtering according to the invention. These interrogatories allow an NMO to specify an object level or group of object levels for which event notifications are to be reported. These interrogatories also allow an NMO to specify a node or group of nodes (event sources) for which events are to be specified and/or to specify a geographical region (individual nodes unspecified). The NMO may also specify a date and/or time interval for which event occurrences are to be reported. The NMO may also specify a type or types of devices involved in an event and/or an event type for which event reporting is required. If a particular event characteristic is not of concern to the NMO, the "Characteristic" column would be left blank and the "Don't Care" column would be marked with an "X" or some other suitable symbol. Parameters that are explicitly specified are treated as subset specifications in a Boolean intersection. Specification of objects and characteristics may also be done by any other suitable means of data entry.

For example, an event filter interrogatory that specifies (S1) object levels 2–4, (S2) event sources within a geographical region R, and (S3) events occurring within a time interval $t1 \leq t \leq t2$, will filter and report only those events that lie in all of the specified subsets (S1), (S2) and (S3); all other parameters are ignored in this event filtering. The set of interrogatories shown in FIG. 5 is not intended to limit the event characteristics that can be specified according to the invention. One or more of the event characteristics shown in FIG. 5 can be optionally deleted.

For example, an NMO responsible for operation of all cellular telecommunications switches in the Frankfurt region might only want to receive ENs for cellular network switches (type of source) in the Frankfurt region (source location). At a particular time of day or time of the week, this NMO might wish to focus on a particular class of problems, such as signal congestion during the hours of 10:00 to 4:00, Frankfurt time, as communicating networks in other time zones also become more active. In this example, the NMO can subscribe for ENs based on event source location, event source type, day and/or time interval of event occurrence, and event type. The event filtering and EN is performed elsewhere for the NMO, based on operator specifications, so that the operator need not perform the filtering operations itself.

An NMO may be more concerned with a first class of object levels and event characteristics during a first time interval and be more concerned with a second class of object levels and event characteristics during a second time interval. For example, signal traffic congestion may be more important during peak traffic hours, and the results of off-peak, network-initiated source testing may be of greater interest during certain off-peak hours. The invention allows for this by permitting the NMO to modify its list of specified object levels and event characteristics from one time interval to another.

Using the invention described here, it is possible for an NMO to specify and receive reports on events specified by object level or levels and characterized by one or more event attributes, such as event type, event source, event severity, event source location, event component or device type, date and/or time that event occurred, and for any combination of these object levels and event characteristics. The invention provides an improved capability for an NMO to specify, closely monitor and analyze only the class of object levels and event characteristics that are of direct concern to the NMO.

Figure 6:
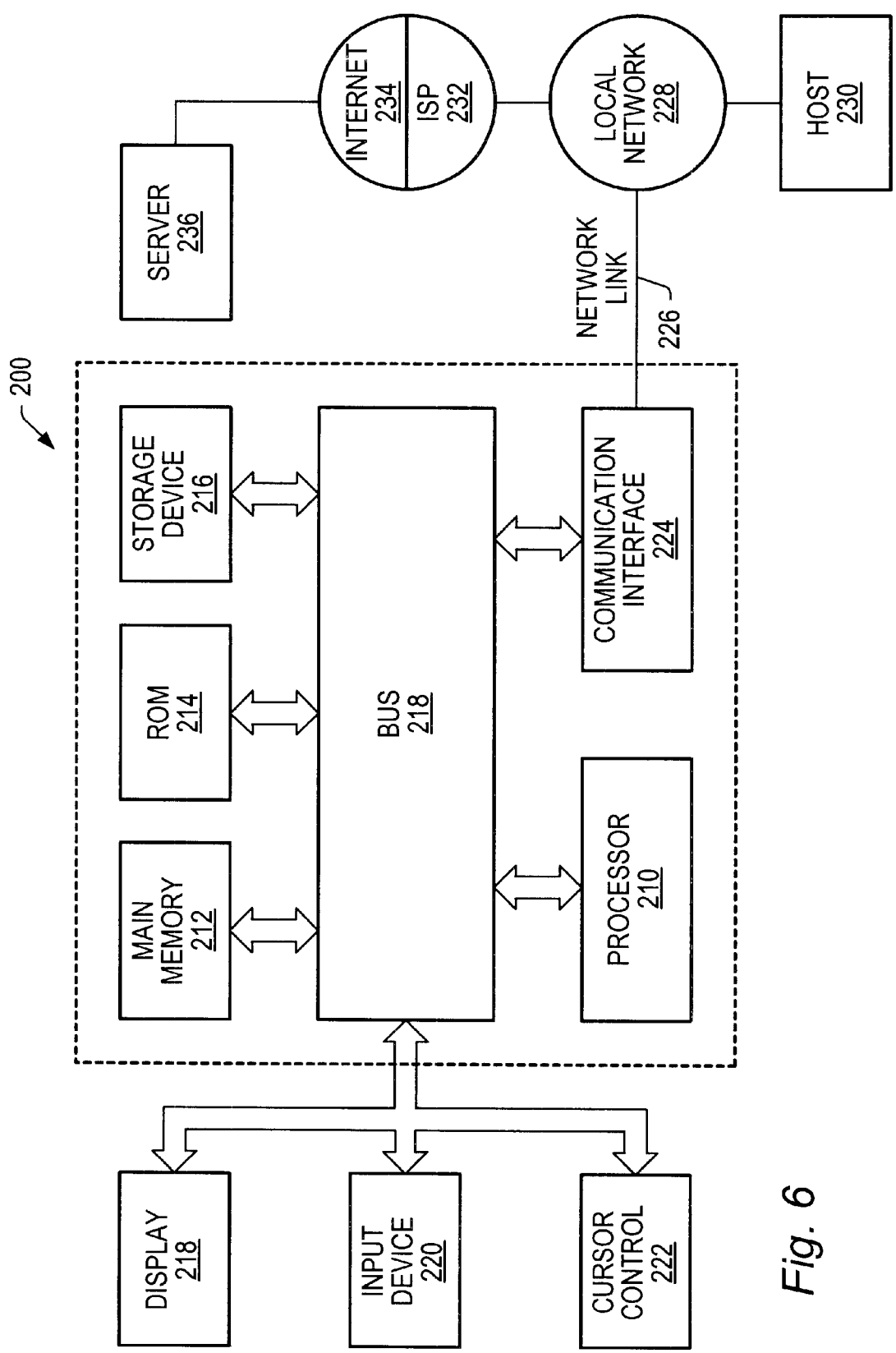
FIG. 6 is a schematic view of a computer system.

FIG. 6 shows a block diagram of a general computer system 200, which may be used to implement various hardware components of the invention, such as a client, an applications server and a database management system. The computer system 200 includes a bus 208 or other communication mechanism for communicating information and a processor 210, coupled with the bus 208, for processing information. The computer system 200 also includes a main memory 212, such as a random access memory (RAM) or other dynamic storage device, coupled to the bus 208, for storing information and instructions to be executed by the processor 210. The main memory 212 also may be used for storing temporary variables or other intermediate information during execution of instructions by the processor 210. The computer system 200 further optionally includes read only memory (ROM) 214 or other static storage device, coupled to the bus 208, for storing static information and instructions for the processor 210. A storage device 216, such as a magnetic disk or optical disk, is provided and is coupled to the bus 208 for storing information and instructions.

The computer system 200 may also be coupled through the bus to a display 218, such as a cathode ray tube (CRT), for displaying information to a computer user. An input device 220, including alphanumeric and other keys, is coupled to the bus for communicating information and commands to the processor 210. Another type of user input device is a cursor control 222, such as a mouse, a trackball or cursor direction keys for communicating direction information and command selections to the processor 210 and for controlling cursor movement on the display 218. This input device typically has one degree of freedom in each of two axes, such as x- and y-axes, that allows the device to specify locations in a plane.

The functionality of the invention is provided by the computer system 100 in response to the processor 210 executing one or more sequences of instructions contained in main memory 212. These instructions may be read into main memory 212 from another computer-readable medium, such as a storage device 216. Execution of the sequences of instructions contained in the main memory 212 causes the processor 210 to perform the process steps described herein. In alternative embodiments, hard-wired circuitry may be used in place of, or in combination with, software instructions to implement the invention. Embodiments of the invention are not limited to any specific combination of hard-wired circuitry and software.

The term "computer-readable medium", as used herein, refers to any medium that participates in providing instructions to the processor 210 for execution. This medium may take many forms, including but not limited to non-volatile media, volatile media and transmission media. Non-volatile media includes, for example, optical and magnetic disks, such as the storage disks 216. Volatile media includes dynamic memory 212. Transmission media includes coaxial cables, copper wire and fiber optics and includes the wires that are part of the bus 208. Transmission media can also take the form of acoustic or electromagnetic waves, such as those generated during radiowave, infrared and optical data communications.

Common forms of computer-readable media include, for example, a floppy disk, a flexible disk, a hard disk, magnetic tape or any other magnetic medium, a CD-ROM, any other optical medium, punchcards, papertape, any other physical medium with patterns of holes or apertures, a RAM, a ROM, a PROM, an EPROM, a Flash-EPROM, any other memory chip or cartridge, a carrier wave as described hereinafter, or any other medium from which a computer can be read.

Various forms of computer-readable media may be involved in carrying out one or more sequences of one or more instructions to the processor 210 for execution. For example, the instructions may initially be carried on a magnetic disk of a remote computer. The remote computer can load the instructions into its dynamic memory and send the instructions over a telephone, using a modem. A modem local to the computer system 200 can receive data over a telephone line and use infrared transmitter to convert and transmit the data to the an infrared detector connected to the computer system bus. The bus will carry the data to the main memory 212, from which the processor receives and executes the instructions. Optionally, the instructions receive by the main memory 212 can be stored on the storage device 216, either before or after execution by the processor 210.

The computer system 200 also includes a communications interface 224, coupled to the bus 208, which provides two-way data communication coupling to a network link 226 that is connected to a local area network (LAN) or to a wide area network (WAN). For example, the communications interface 224 may be an integrated services digital network (ISDN) card or a modem to provide a data communication connection to a corresponding type of telephone line. As another example, the communications interface 224 may be a local area network card to provide a data communication connection to a compatible LAN. Wireless links may also be implemented. In any such implementation, the communications interface 224 sends and receives electrical, electromagnetic or optical signals that carry digital data streams representing various types of information.

The network link 226 typically provides data communication through one or more networks to other data devices. For example, the data link 226 may provide a connection through an LAN 228 to a host computer 230 or to data equipment operated by an Internet Service Provider (ISP) 232. The ISP, in turn, provides data communication services through the world wide packet data communication network, now commonly known as the "Internet" 234, served by one or more servers 236. The LAN 228 and the Internet 234 both use electrical, electromagnetic and/or optical signals to carry the digital data streams. The signals carried by these network, the signals carried on the network link 226 and the signals carried on the communications interface 224, are examples of carrier waves that transport the information.

What is claimed is:

1. A computer implemented method of managing operations on a network, the method comprising:

receiving on a network an event communication that characterizes an event that has occurred at, or that affects, one or more network participants;

examining the event communication to determine whether the event is associated with at least one object or object level on a selected object list having at least one specified object or object level; and when the event is associated with at least one object or object level that is on the object list, taking at least one of two actions: (1) communicating selected information that describes the event to a selected event information recipient; and (2) storing selected information on the event; and examining said event communication to determine whether said event has at least one event characteristic that appears on a selected event list of at least one specified event characteristic; and when said event has at least one characteristic that is on the characteristic list, taking at least one of two actions: (1) communicating said selected information on at least one selected event characteristic that describes said event to a selected event information recipient; and (2) storing said selected information on said event; wherein said characteristic list is chosen to include at least one of the following event characteristics: one or more specified network nodes involved in said event; a specified geographical region in which said event occurs; a specified time interval within which said event occurs or is initiated; a specified class of devices involved in said event; specified severity of said event; and said event is one or more specified event types.

2. The method of claim 1, further comprising: when said event does not have at least one characteristic that is on said characteristic list, taking no action on said event communication.

3. The method of claim 1, further comprising storing said selected information on said event having at least one characteristic that is on said characteristic list, and communicating said selected information on said at least one selected event characteristic to said selected event information recipient at a selected later time.

4. The method of claim 1, further comprising modifying said characteristic list at least once for a selected reporting time interval.

5. The method of claim 1, further comprising modifying said object list at least once for a selected reporting time interval.

6. A computer implemented system for managing operations on a network, the method comprising a computer that is programmed:

to receive on a network an event communication that characterizes an event that has occurred at, or that affects, one or more network participants;

to examine the event communication to determine whether the event is associated with at least one object or object level on a selected object list having at least one specified object or object level; and when the event is associated with at least one object or object level that is on the object list, to take at least one of two actions: (1) communicate selected information that describes the event to a selected event information recipient; and (2) store selected information on the event; and to examine said event communication to determine whether said event has at least one event characteristic that appears on a selected event list of at least one specified event characteristic; and when said event has at least one characteristic that is on the characteristic list, to take at least one of two actions: (1) communicate said selected information on at least one selected event characteristic that describes said event to a selected event information recipient; and (2) store said selected information on said event; wherein said selected characteristic list is chosen to include at least one of the following event characteristics: one or more specified network nodes involved in said event; a specified geographical region in which said event occurs; a specified time interval within which said event occurs or is initiated; a specified class of devices involved in said event; specified severity of said event; and said event is one or more specified event types.

7. The system of claim 6, wherein, when said event does not have at least one characteristic that is on said characteristic list, said computer is programmed to take no action on said event communication.

8. The system of claim 6, wherein said computer is further programmed: to store said selected information on said event having at least one characteristic that is on said characteristic list; and to communicate said selected information on said at least one selected event characteristic to said selected event information recipient at a selected later time.

9. The system of claim 6, wherein said computer is further programmed to modify said characteristic list at least once for a selected reporting time interval.

10. The system of claim 6, wherein said computer is further programmed to modify said object list at least once for a selected reporting time interval.

11. A computer program product embodied in a computer usable medium having a computer readable code mechanism embodied therein for managing transactions, the computer program product comprising:

a first computer readable code mechanism configured to receive on a network an event communication that characterizes an event that has occurred at, or that affects, one or more network participants;

a second computer readable code mechanism configured to examine the event communication to determine whether the event is associated with at least one object or object level on a selected object list having at least one specified object or object level;

a third computer readable code mechanism configured so that, when the event is associated with at least one object or object level that is on the object list, to take at least one of two actions: (1) communicate selected information on the event that describes the event to a selected event information recipient; and (2) store selected information on the event; and wherein at least one of said first, second and third code mechanisms is configured: to examine said event communication to determine whether said event has at least one event characteristic that is on said characteristic list; and when said event has at least one characteristic that is on said characteristic list, to take at least one of two actions: (1) communicate said selected information on at least one selected event characteristic that describes said event to a selected event information recipient; and (2) store said selected information on said event; wherein said selected list associated with said second code mechanism includes at least one of the following event characteristics: one or more specified network nodes involved in said event; a specified geographical region in which said event occurs; a specified time interval within which said event occurs or is initiated; a specified class of devices involved in said event; specified severity of said event; and said event is one or more specified event types.

12. The computer program product of claim 11, wherein, when said event does not have at least one characteristic that is on said characteristic list, said third code mechanism takes no action on said event communication.

13. The computer program product of claim 11, wherein at least one of said first, second and third code mechanisms is further configured: to store said selected information on said event having at least one characteristic that is on said characteristic list: and to communicate said selected information on said at least one selected event characteristic to said selected event information recipient at a selected later time.

14. The computer program product of claim 11, at least one of said first, second and third code mechanisms is further configured to modify said characteristics list of said at least once for a selected reporting time interval.

15. The computer program product of claim 11, at least one of said first, second and third code mechanisms is further configured to modify said object list of said at least once for a selected reporting time interval.

* * * * *